United States Patent [19]  [11] Patent Number: 5,372,637
Dwight, Jr.  [45] Date of Patent: Dec. 13, 1994

[54] AQUEOUS COMPOSITIONS FOR DELIVERING ACTIVE INGREDIENTS AND METHODS OF MAKING AND USING SAME

[76] Inventor: Theodore W. Dwight, Jr., 115 Windsor Rd., Tenafly, N.J. 07670

[21] Appl. No.: 25,278

[22] Filed: Mar. 2, 1993

[51] Int. Cl.$^5$ ............... C08L 83/04; C08L 91/00
[52] U.S. Cl. ................... 106/244; 252/310; 106/38.24; 106/38.25; 106/38.22; 106/38.7; 106/38.8; 106/2; 106/771; 106/285; 106/287.14; 106/287.28
[58] Field of Search ............... 106/38.24, 38.25, 38.22, 106/38.7, 38.8, 2, 271, 244, 285, 287.14, 287.28; 252/310

[56] References Cited

U.S. PATENT DOCUMENTS

| | | | |
|---|---|---|---|
| 4,127,419 | 11/1978 | Szuhaj et al. | 106/244 |
| 4,615,738 | 10/1986 | Sanders, Jr. et al. | 106/287.14 |
| 4,757,106 | 7/1988 | Mayer et al. | 106/287.14 |
| 5,104,447 | 4/1992 | Stewart et al. | 106/2 |
| 5,228,905 | 7/1993 | Grunewalder et al. | 106/271 |

Primary Examiner—Mark L. Bell
Assistant Examiner—C. M. Bonner
Attorney, Agent, or Firm—Weil, Gotshal & Manges

[57] ABSTRACT

An aqueous composition comprising an active ingredient, a volatile organic compound and water, which is homogenized so that at least 90% by weight of the active ingredient are in particles of less than 1.0 micron in diameter, may be used to deliver an active ingredient. Suitable active ingredients include, but are not limited to, mold releases, coatings, solvents and reactive compounds.

26 Claims, 10 Drawing Sheets

5,372,637

AQUEOUS COMPOSITIONS FOR DELIVERING ACTIVE INGREDIENTS AND METHODS OF MAKING AND USING SAME

BACKGROUND OF THE INVENTION

Many industrial processes involve operations in which active ingredients are delivered in compositions carried by organic solvents. Due to environmental concerns, manufacturers have been seeking to discontinue the use of organic solvents and substitute water as the carrier of the active ingredients. Organic solvents tend to be at least somewhat toxic and contribute to air pollution, e.g., by creating smog. Additionally, some volatile organics are known to be catalysts in the destruction of ozone in the upper atmosphere, particularly dichlorodifluoromethane and trichlorofluoromethane, which have been used extensively in propellants for aerosols and as blowing agents.

Particular compositions where active ingredients are carried by a liquid include mold release compositions which are sprayed, or otherwise applied onto the surface of a mold so that the product to be made in the mold may be readily removed therefrom. The major components of such compositions have been a solvent and an active ingredient, such as a release lubricating agent or another solvent. Previously, most mold release compositions included volatile organics as solvents which normally make up about 90.0% to about 99.5%, by weight, of the compositions, and most commonly about 95.0% by weight.

In some mold release compositions, water has been used as a carrier in which the active ingredient and water is used in place of volatile organic solvents. Additional agents such as emulsifiers and wetting agents have also generally been used in such compositions. Water is not considered a solvent in such compositions because active ingredients are generally insoluble in water; however, the water serves the same basic function as the organic solvent did—to deliver the active ingredient. These compositions have been used in rubber-processing plants and have been used recently to release some plastic and polyurethane parts.

Water has several distinct advantages over organic solvents in its use as a carrier, in that it is non-toxic, environmentally friendly and inexpensive. On the other hand, water has some significant disadvantages as a replacement for organic solvents in liquid compositions used to deliver active ingredients (hereinafter "delivery compositions"). Water does not coat most surfaces evenly since it is repelled by many materials, e.g., metals, plastics, and glass. Rather, water tends to form beads or droplets on surfaces so that, when the water evaporates, the compounds dispersed in the water are deposited unevenly on the surface. The addition of surfactant and other similar substances to the delivery compositions is only partially successful in eliminating this problem.

Additionally, most compounds that are used as active ingredients, such as lubricating or release agents, are relatively immiscible in water. Substantive amounts of emulsifiers, surfactants or other substances have had to be used with the water to mix these otherwise immiscible ingredients together. Emulsifiers and surfactants are normally non-volatile, chemically modified fatty acids and other compounds that have segments of the molecule that are soluble in the water and segments that are soluble in the material to be suspended, e.g., ethoxylated fatty acid esters. Since emulsifiers and surfactants are not volatile, they remain with and mix with the active ingredient(s) when the water evaporates. They are usually present in amounts up to 10 to 20% of the active ingredient and may interfere with the operation of the active ingredient. In addition, the surfactants or emulsifiers may be chemically unstable under tile conditions of use and may decompose due to heat or for other reasons with deleterious results.

Attempts to solve this problem by adding less emulsifier to the water to minimize emulsifier build-up and by adding water soluble solvents which have been only partially successful because the emulsion or dispersion becomes less stable and the active ingredients tend to separate.

SUMMARY OF THE INVENTION

The present invention relates to a unique method for making an aqueous delivery composition wherein an active ingredient which is insoluble in water (or only slightly soluble), which active ingredient could have other compounds dissolved in it, is suspended in water using a volatile organic that is soluble in both the water and the compound to be suspended. The active ingredient has a low enough viscosity so that it may be homogenized so that at least 90% by weight of the particles of the active ingredient are less than one micron in diameter. Additionally, the volatile organic is usually fugitive.

Additionally, specifically a mold release composition comprising an active ingredient, such as a lubricating or release agent or a water-insoluble solvent, and water, wherein water is the liquid carrier in which the active agent is dispersed, may be improved by the addition of a volatile organic compound and the homogenization of said composition to achieve a particle size of essentially all of the active ingredient contained therein of less than about 1.0 micron in diameter measured via photon correlation spectroscopy.

DETAILED DESCRIPTION OF THE INVENTION

I. General Composition

Adding certain volatile organics, such as alcohols and amines, to delivery compositions in which water is the carrier and homogenizing said composition has surprising results in increasing the utility of water as a carrier in delivery compositions. As contemplated herein, delivery compositions are comprised of about 60% to about 94% water, about 4% to about 20% of an active ingredient, about 2% to about 30% of a volatile organic and about 0.003% to about 0.5% of a surfactant, with all percentages being based on weight of the final composition. Optional ingredients in the composition include, but are not limited to resins, coatings, and organic compounds.

II. Volatile Organics

The volatile organics of the present invention reduce the surface tension of the water which reduces the beading of the composition when sprayed. The volatile organics are preferably fugitive, i.e., volatile at the temperature and condition of its intended use, so they can be removed from the other ingredients and so as not to build up on surfaces. In the case where the active ingredients chemically react to form a new compound, the volatile organic may be evaporated or be part of the new composition and so does not necessarily need to be fugitive. The presence of volatile organics causes the water to wet surfaces better than water alone, producing a smoother, more even film on surfaces. By using volatile organics in a composition of the present invention, emulsifiers or dispersing agents, that constituted 10% to 20% of the weight of the suspended material in prior aqueous delivery compositions, can be eliminated from the composition because the volatile organics component increase the dispersibility of active ingredients in the water.

The volatile organics that may be used in the present invention are generally those compounds which are substantially soluble in water and in which the active ingredient is substantially miscible. Exemplary volatile organics for use in the present invention are low molecular weight alcohols and amines or in general polar solvents having fewer than 8 carbons and having viscosities of less than 10 centistokes (csks) at 25° C. that evaporate relatively quickly at the temperature of use. Exemplary alcohols for use in the present invention include, but are not limited to, ethanol, 1-propanol, isopropanol, 1-butanol, 2-butanol, and glycols such as 1-methoxy 2-propanol. Exemplary amines for use in the present invention include, but are not limited to, 1-propyl amine and 2-propyl amine. Such amines and alcohols are not destructive to the ozone layer. Amines tend to produce a more even dispersion in compositions of the present invention but they also tend to be more toxic than alcohols and their usage may not be preferred in circumstances requiting more than minimal amounts of the composition, due to their toxicity. Of the alcohols, isopropyl alcohol has been found to be a preferred additive.

The volatile organic should be present at about 2% to about 30% by weight of the total composition. A mixture of various volatile organics may be used. The greater the amount of volatile organic in the solution, the greater the amount of water-insoluble material, i.e., the active ingredient that may be added to the solution, e.g., in a composition containing 8% by weight isopropyl alcohol, 5% silicone may be added, while in a composition containing 23% by weight isopropyl alcohol, 18% by weight silicone may be added. Note, however, that as the percent of volatile organic increases, the benefits of an aqueous solution are diminished, e.g., toxicity and price may increase. Generally, when a composition contains greater than 9% by weight of isopropyl alcohol, it becomes flammable at room temperature and should be handled accordingly.

III. Active Ingredients

Active ingredients for use herein can have with a viscosity of about 0.5 to about 10,000, csks at 25° C., though the lower the viscosity the better the resulting suspension. The preferred range of viscosities for the active ingredients is 0.5 to 100 csks at 25° C., with the most preferred range to is 0.5 to 40 csks. Low viscosities make it possible to achieve a better suspension of the active ingredients in the composition because it results in a finer particle size thereof.

The active ingredients selected depend upon the application. For example, in mold release compositions, the active ingredient is a lubricating or release agent, such as silicones, low melting point waxes, lecithin, hydrocarbon oils, chlorinated solvents, vegetable derived compounds or mixtures thereof. Other active ingredients include solvents, napthas, vegetable oils, fatty acid and insoluble soaps, such as magnesium and zinc stearate xylenes and like compounds. Active ingredients can includes reactants for delivery, into a chemical reaction.

A preferred composition with a low viscosity silicone with the needed release capability for mold release compositions is a mix of a standard low viscosity (20 csks) dimethyl silicone with a structure of $[-Si(CH_3)_2-O-]_n$ be mixed with a higher viscosity dimethyl silicone with the desired release properties. The ratio of low viscosity (about 20 csks) silicone, to the higher viscosity silicone (about 350 csks) is about 80 and 20 percent by weight, but other ratios may be used.

Solvents which are insoluble in water may be used as all or part of the active ingredients in the present invention. The solvents are volatile at the temperature or condition of application or if they are not volatile, become part of the coating by mixing or polymerization. Moreover, solvents that provide a leveling (spreading) effect to any additives, which may or may not react with such additive, are useful. Suitable solvents include, but are not limited to, naphthas, paraffins, and water-insoluble aromatic compounds.

Other examples of such ingredients include silicone resins which may be dissolved in solvents and dispersed in the water to make a semi-permanent or permanent mold coatings for releasing rubber, plastic or other polymers. Similarly, other coatings, such as paints, vanishes, and other protective coatings or also various adhesive compounds may be used. In particular applications solvents, as discussed above, may be needed to be added to the composition to carry such active ingredients and so should be included in the composition as an active ingredient along with any release or lubricating agents.

However, one must ensure that the viscosity of the composition is not increased sufficiently to disturb the wetting ability of the composition which may occur at viscosities of about 1,000 to about 10,000 csks at 25° C.

IV. Homogenization While the presence of a volatile organic in a water-based delivery composition helps disperse the active ingredient, additional steps should be taken to disperse the active ingredient evenly throughout the composition and to avoid having agglomerations of the active ingredient(s) within the dispersion. This is preferably accomplished by homogenizing the composition so that the particles are sufficiently small to obtain an even distribution of fine particles of active ingredient throughout the composition. Homogenization results in a finer particle size and a better, more stable suspension of the active ingredient.

Compositions that are not homogenized generally have a shelf life of a few hours. Like oil and water, such compositions tend to separate relatively quickly. However, the homogenized delivery compositions of the present invention surprisingly have been found to have shelf lives of three months or more. Generally, the lower the viscosity of the active ingredient, the longer the shelf life of the composition. If a slight separation does occur, the solution can be reconstituted readily by shaking or other types of mixing or agitation. However, generally, the homogenized composition is stable, that is, it may be heated to 60° C. and left overnight without separating into different phases.

The volatile organics assist both in the creation of the dispersion of the active ingredient throughout the composition and in the maintenance of the homogenized composition by creating conditions favorable for this meta-stable state.

A Cowls mixer homogenizer or a Manton Gaulin, such as are used to homogenize milk, are examples of apparatus suitable for use to homogenize compositions of the present invention. Such mills are generally available from manufacturers such as Shar, Inc. of Fort Wayne, Ind. and A. P. V. Gaulin, Inc. of Wilmington, Mass.

After homogenization, particle sizes of the active ingredient in the composition are typically about 0.10μ to about 0.40μ in diameter, measured via photon correlation spectroscopy, but may have a diameter as high as 1.0μ. The particles also typically have a mass weighted median diameter of about 0.10μ to about 0.16μ. The small particle sizes in the compositions of the present invention permit the achievement of even deposition of the active ingredient on the mold surface. Particles preferably have a mass weighted median diameter of about 0.10μ to about 0.16μ, but much smaller particles may be used in accordance with the present invention. In solutions of higher viscosities (greater than 10,000 csks at 25° C.) such small particles will not form.

Note, however, there is a considerable spread in particle sizes about the mean size. It is therefore desirable that at least 90% by weight of the particles of the active ingredient have a mass weighted diameter of less than about 1.0μ.

V. Surfactant

Surfactants are preferably added to the homogenized composition, at about 25 to 5000 ppm (about 0.0.03% to about 0.5% by weight). The surfactant lowers the surface tension of the water and improves the dispersion of the composition with the advantages as stated above and allows better wetting of the surface. Suitable surfactant for use in the present invention include, but are not limited to, a mixture of fluorinated alkyl alkoxylates and sulfonomides, e.g., FC171 from 3M (Minnesota Mining & Manufacturing), fluorocarbons, e.g., ZONYLS FSN from Dupont, alcohol sulfate amine salts, e.g., DUPONNOL G from Dupont, alcohol phosphate salts, e.g., ZELEC NE from Dupont and alkyl phosphate ethoxylates, e.g., ZONYL-A from DuPont.

VI. Applications

The delivery composition as described may be used as a sprayable liquid or in aerosol cans depending on the required usage. Compositions may also be applied with a brush, rag or similar means.

The delivery composition may be made first in a concentrated homogenized form and additional water may be added just prior to usage, with the composition being mixed before actual use. This allows for a more ready storage of the composition.

VII. Optional Ingredients

A particularly beneficial additional component of the present invention is a water-soluble surfactant/levelling agent which can triple the shelf life of compositions of the present invention. Such agents may be added at 0.1–1.0 % by weight to delivery compositions of the present invention as compared to the 10–20% of delivery compositions previously required. In such small quantities by weight these agents do not leave a deposit that would interfere with the delivery but do improve the ability of the active ingredient to remain in solution. Exemplary agents are SILWET L-77, SILWET L-7602 and SILWET L-7001, brand exthoxylated silicone surfactant all available from Union Carbide Corporation of Danbury, Conn.

VIII. Examples

Example 1—Mold Release Composition

Isopropyl alcohol and a silicone solution were added to water so that the weight percentages of these ingredients were respectively, 6, 5, and 89 percent. The silicone composition was made up of 80% by weight of a low viscosity silicone, DC-200 (20 csks) from Dow Corning, and 20% by weight a high viscosity silicone, RA-157, from Genesee Polymer. The mixture was then homogenized in a high speed lab mixer with two straight blades which were sharpened on the leading edge. A wetting agent, FC-171 at 200 ppm and SILWET L-77 brand ethoxylated silicone surfactant at 50 ppm, were added to this suspension.

The suspension was left undisturbed for eleven days. The suspension had a mottled surface, which suggested an oil slick, covered about two-thirds of it, though only about 10% of the suspension was separated. Shaking the sample redispersed the smaller globules, and there was no particular tendency to foam. However, it separated again after 24 hours.

The suspension was sampled beneath the surface and evaluated for particle size in acrylic cuvettes with a Brookhaven BI-90 photon correlation spectrometer. The suspended solid, the silicone, was found to have a diameter measured via light scattering by photon correlation spectroscopy (hereinafter the "diameter via light scattering") of 0.73±0.11μ, intersity weighted, with a normalized standard deviation of $2.6_o$. The mass-weighted median diameter of these particles was found to be 0.12μ with a normalized standard deviation of $2.6_o$. The differential mass-weighted particle size distribution is illustrated in FIG. 1. The cumulative mass weighted particle size distribution is illustrated in FIG. 2.

This sample released polyurethane plastic well but it had to be agitated before it was used. If agitated prior to use, the shelf life was two to three months.

Example 2—Mold Release Composition

Isopropyl alcohol and a silicones composition were added to water so that the weight percentages of these ingredients were, respectively, 8, 6, and 86. The silicone composition was made up of 80% by weight of a low viscosity silicone, DC-200 (20 cks) from Dow Corning, and 20% by weight a high viscosity silicone, RA-157, from Genesee Polymer. The mixture was then homogenized in a lab mixer. A wetting agent, FC 171 at 190 ppm and SILWET L-77 brand ethoxylated silicone surfactant at 540 ppm were added to this suspension.

Figure 1:
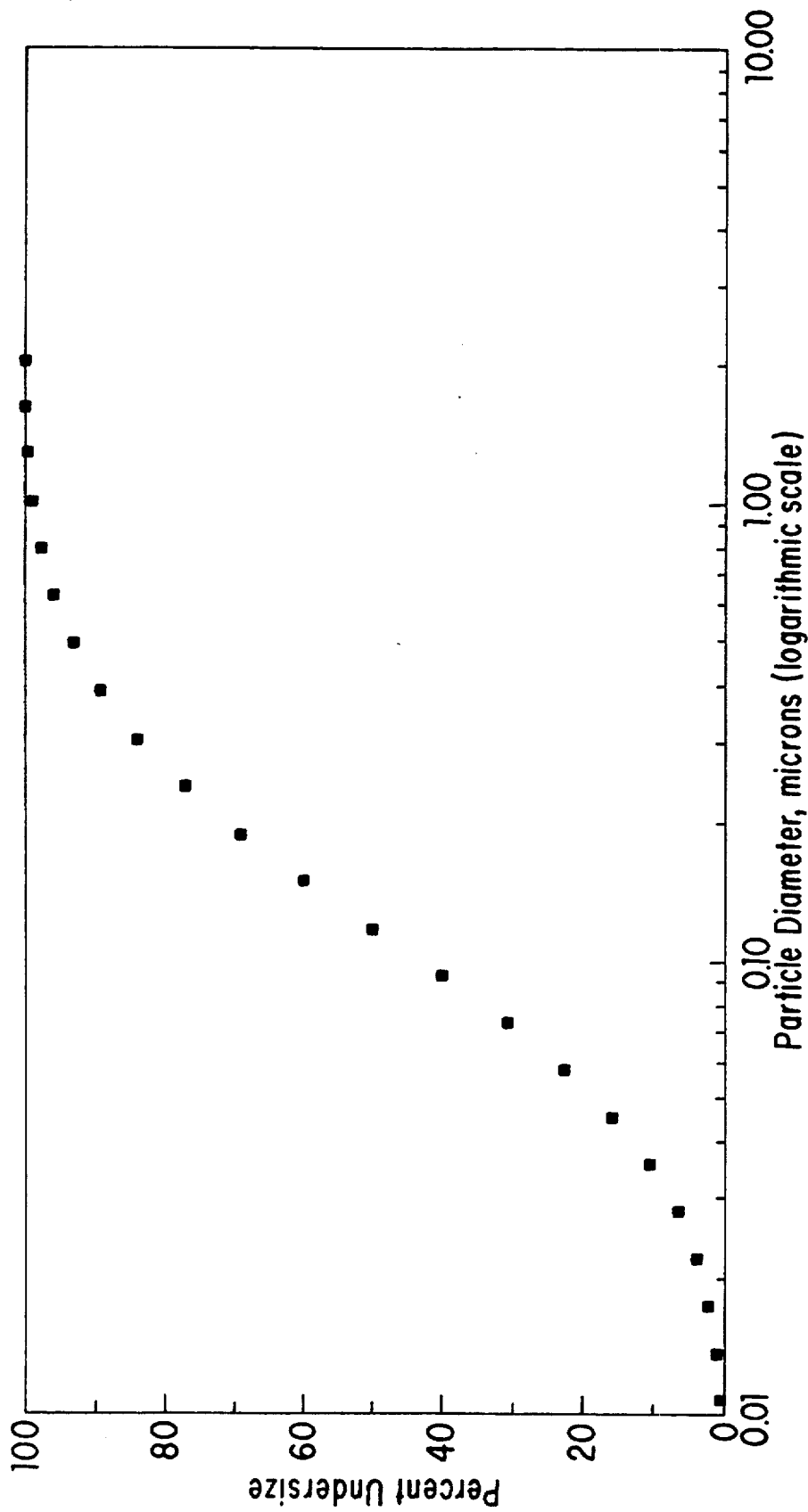
FIG. 1 illustrates the differential particle diameter distribution of a silicone in a composition of the present invention.
Figure 2:
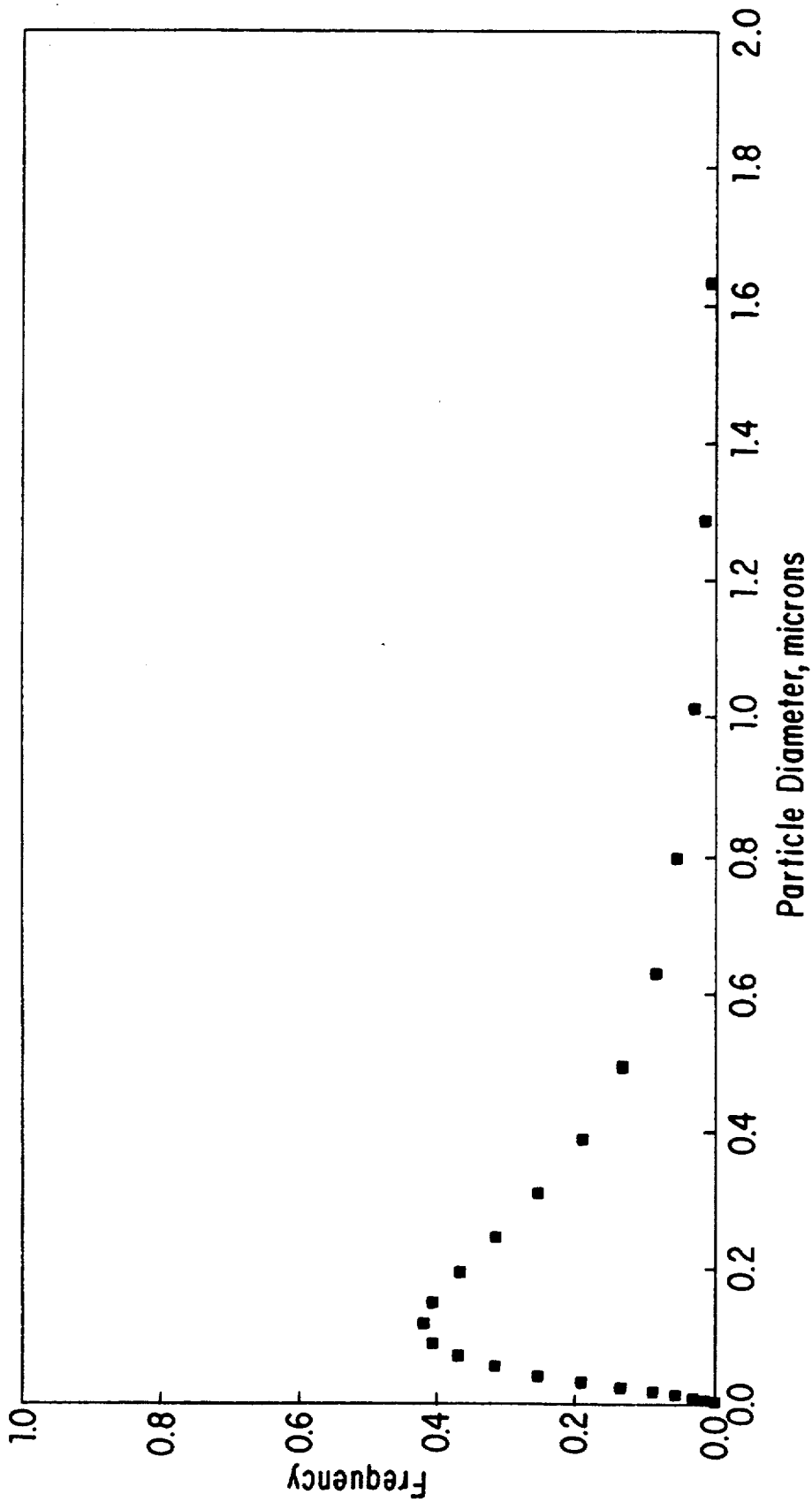
FIG. 2 illustrates the cumulative particle diameter distribution of a silicone in a composition of the present invention.
Figure 3:
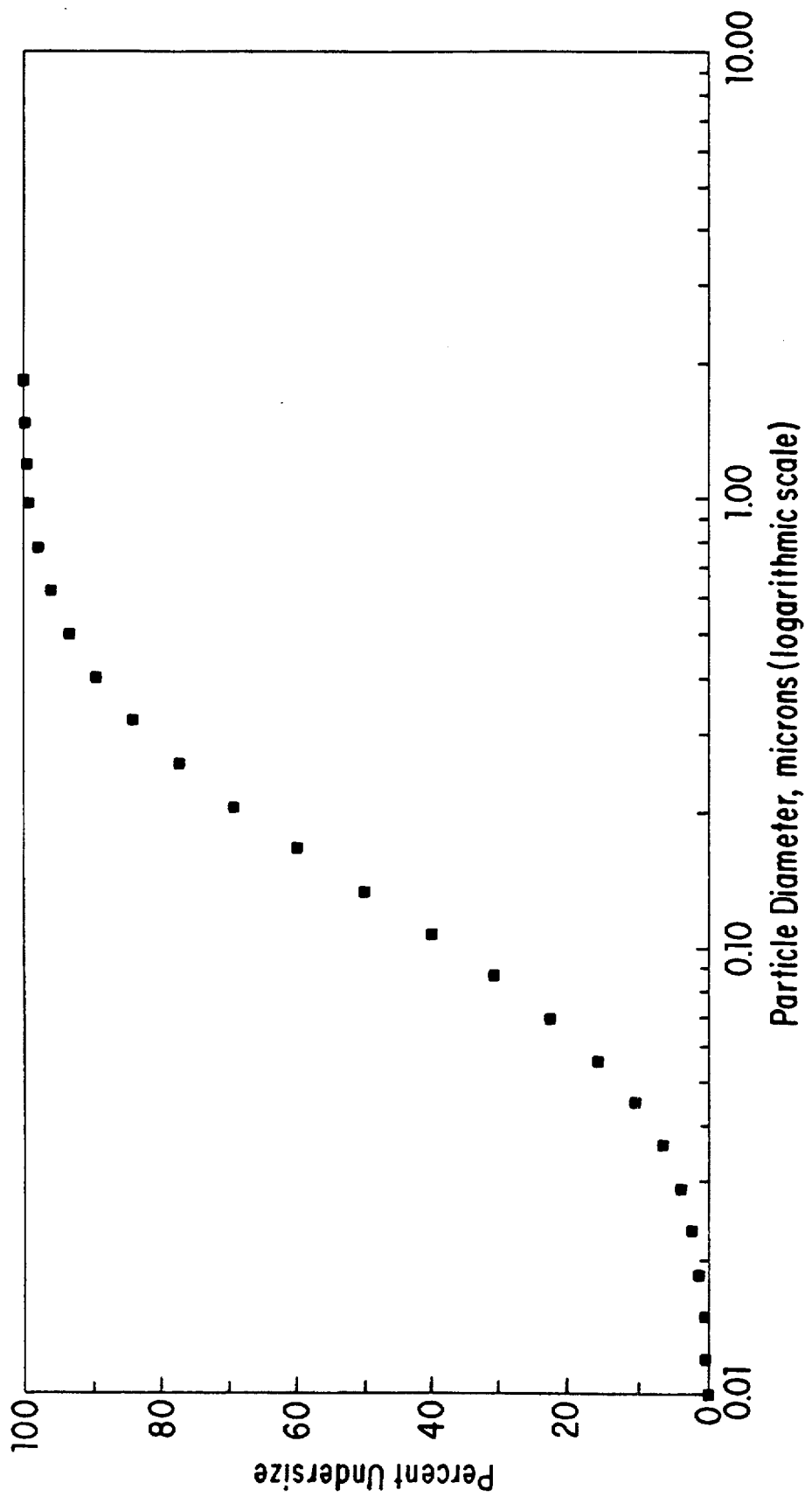
FIG. 3 illustrates the differential particle diameter distribution of a silicone in a composition of the present invention.
Figure 4:
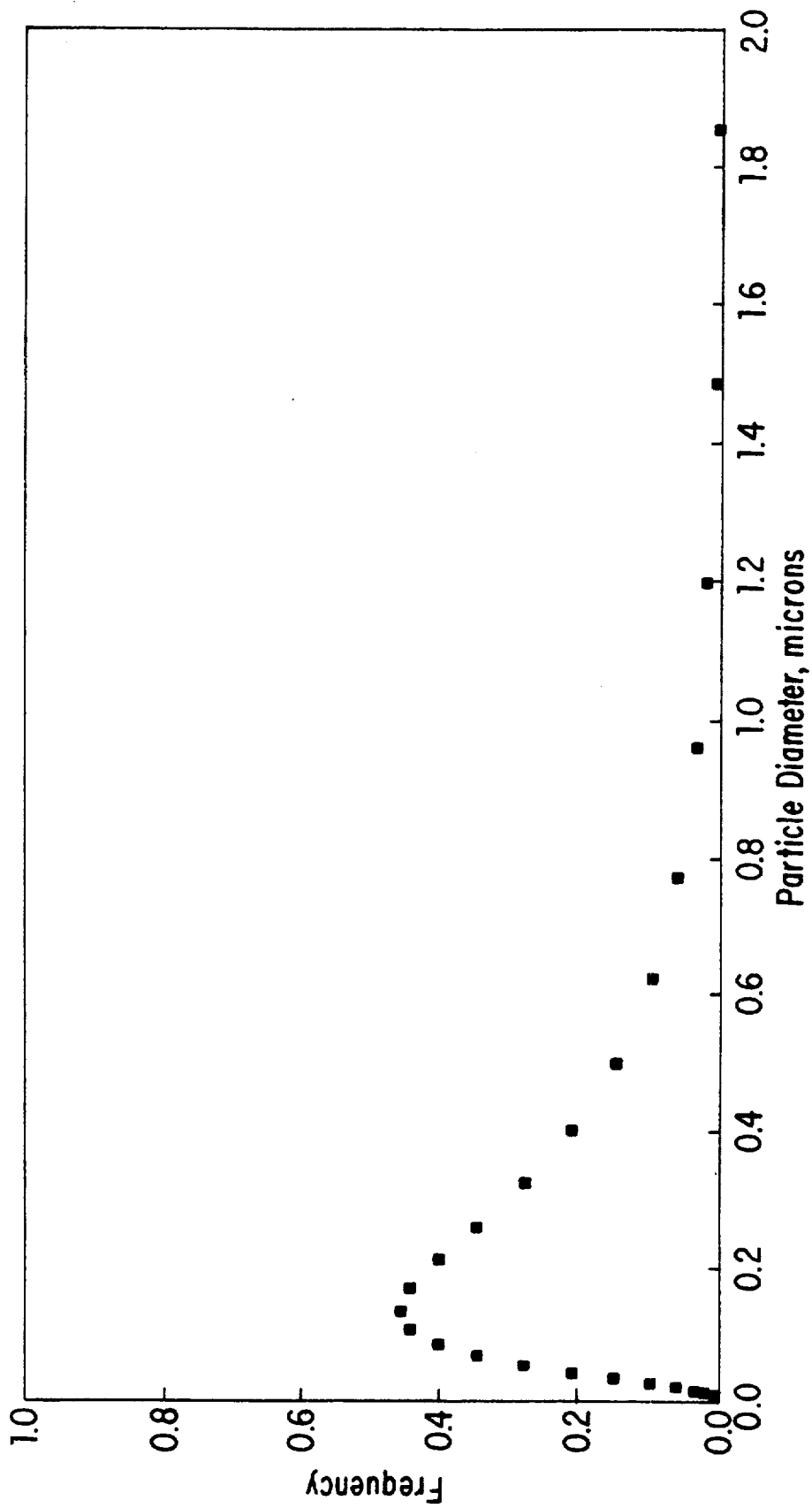
FIG. 4 illustrates the cumulative particle diameter distribution of a silicone in a composition of the present invention.

The suspension was left undisturbed for five days. Little separation was seen after the five days. The suspension was sampled beneath the surface and evaluated for particle size in acrylic cuvettes with a Brookhaven BI-90 photon correlation spectrometer. The suspended solid, the silicone, was found to have a diameter via light scattering of $0.62 \pm 0.02 \mu$ with a normalized standard deviation of $2.4_o$. The mass-weighted median diameter of these particles was found to be $0.13\mu$ with a normalized standard deviation of $2.4_o$. The differential mass-weighted particle size distribution of this suspension is illustrated in FIG. 3. The cumulative mass weighted particle size distribution of this suspension is illustrated in FIG. 4.

Like Example 1, this sample released polyurethane well.

Example 3—Mold Release Composition

Isopropyl alcohol, a silicone composition and a water soluble silicone, SILWET L-77 brand ethoxylated silicone surfactant, available from Union Carbide, were added to water so that the weight percentages of these ingredients were respectively 6, 5, 0.4, and 88.6. The silicone composition was made up of 80% by weight of a low viscosity silicone, DC-200 (20 cks) from Dow Corning, and 20% by weight a high viscosity silicone, RA-157, from Genesee Polymer. This mixture was homogenized in a Manton Gaulin homogenizer made by APV Gaulin, Inc. A wetting agent, FC-171, was added at 1000 ppm to the suspension.

Figure 5:
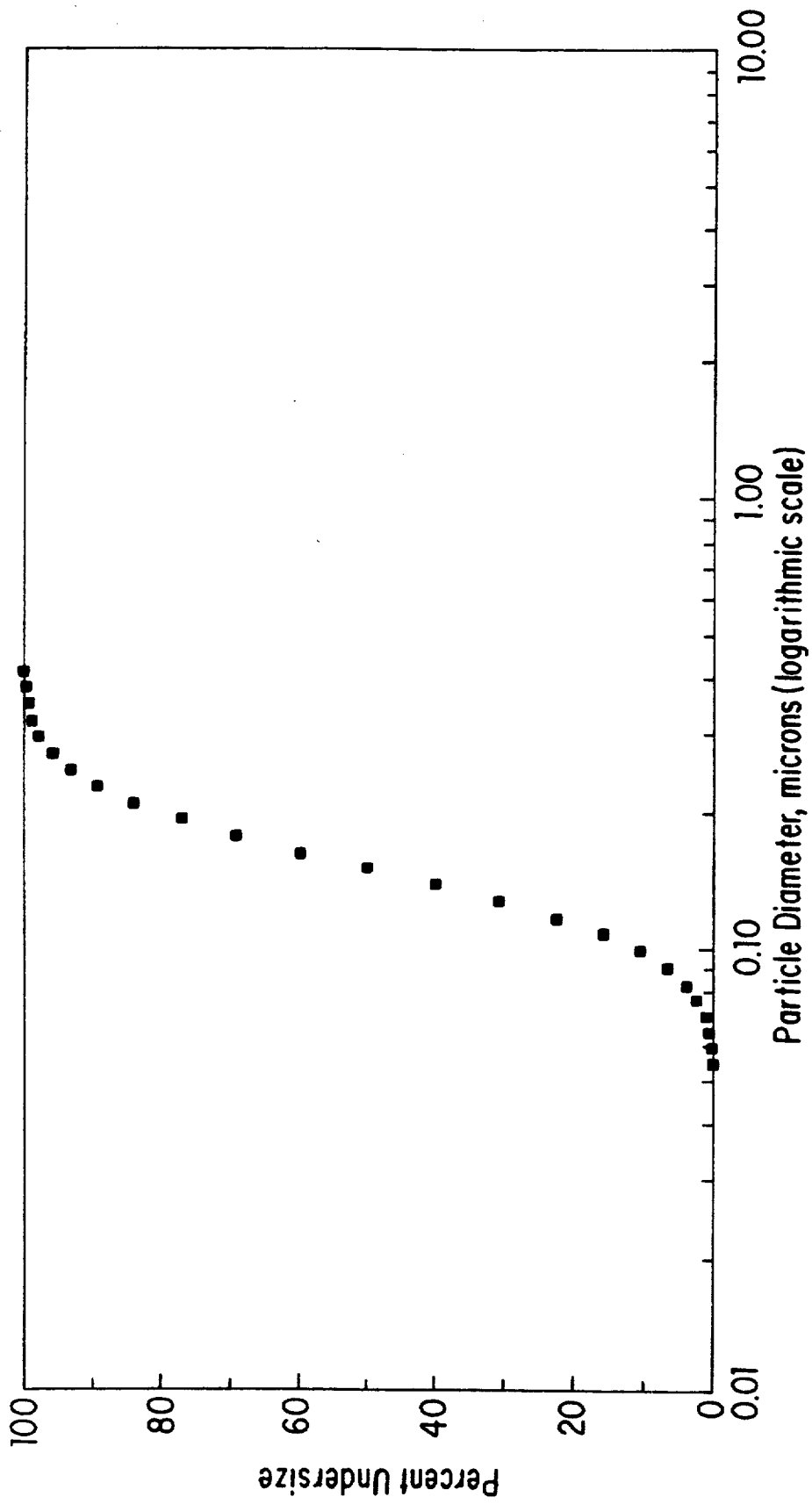
FIG. 5 illustrates the differential particle diameter distribution of a silicone in a composition of the present invention.
Figure 6:
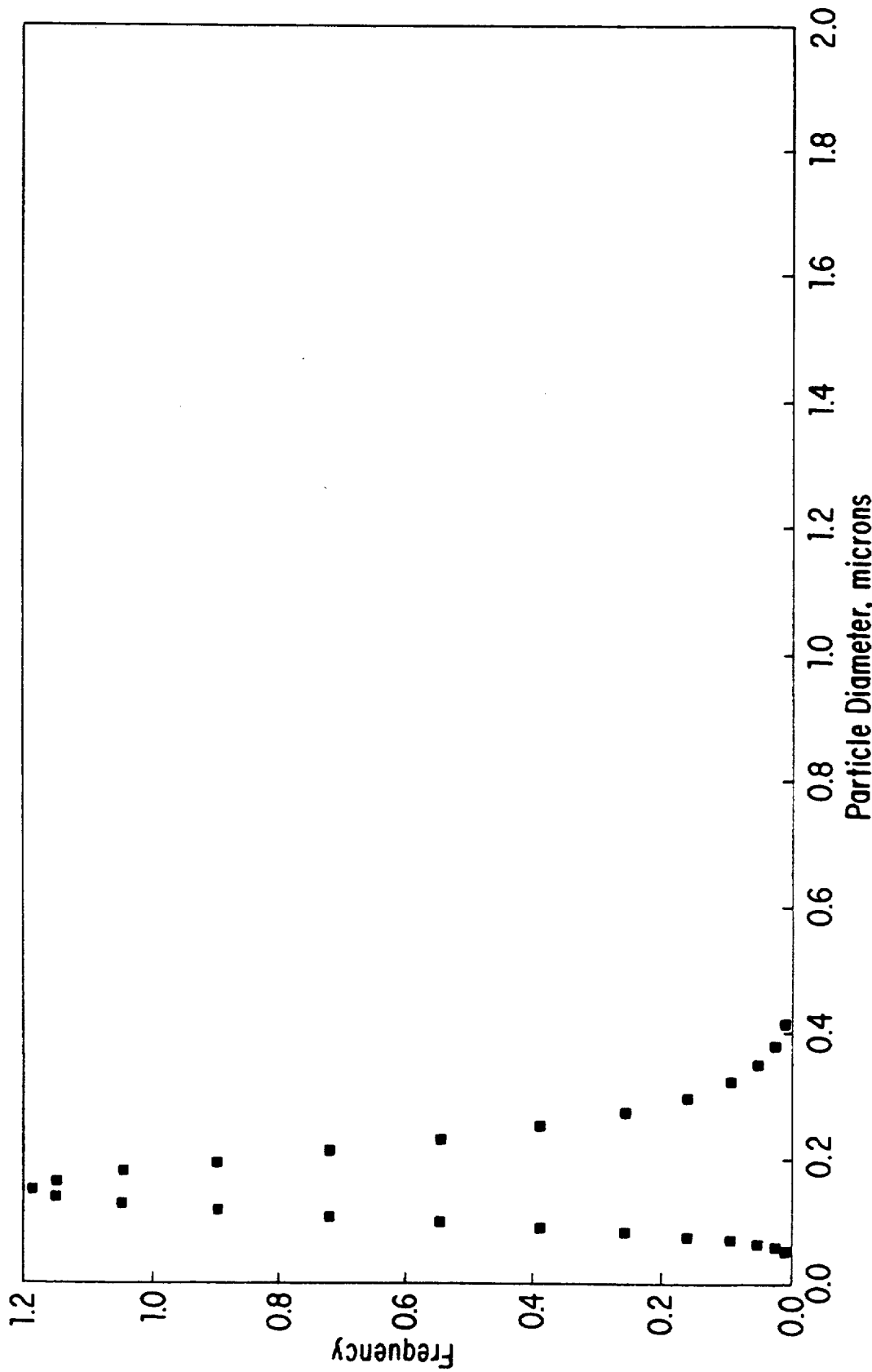
FIG. 6 illustrates the cumulative particle diameter distribution of a silicone in a composition of the present invention.

A sample of the suspension was left in the oven for 16 hours at 60° C. without separation occurring. After 30 days slight separation occurred, but it was readily dispersed with light agitation. The differential mass-weighted particle size distribution of this suspension is illustrated in FIG. 5. The cumulative mass weighted particle size distribution of this suspension is illustrated in FIG. 6.

This composition makes an excellent mold release composition.

Example 4—Mineral Spirit Release

Isopropyl alcohol, SILWET L-77 brand ethoxylated silicone surfactant, and mineral spirits, QUIKDRI from Ashland Chemical, were added to water so that the weight percentages of these ingredients were respectively 6, 0.4, 5 and 88.6. This mixture was homogenized in the lab mixer. A wetting agent, FC-171, was added at 1000 ppm to the suspension.

Figure 7:
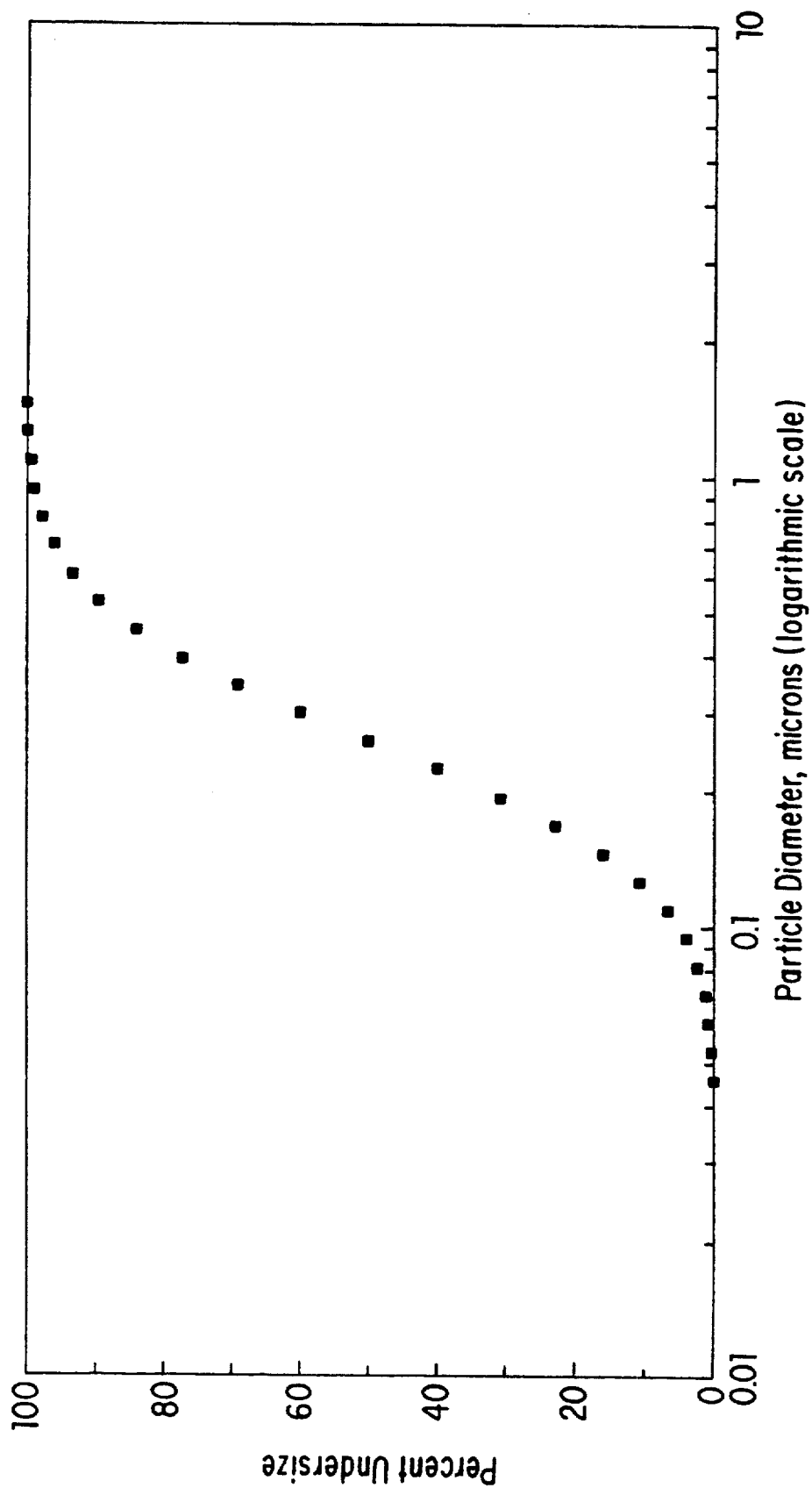
FIG. 7 illustrates the differential particle diameter distribution of a mineral spirits in a composition of the present invention.
Figure 8:
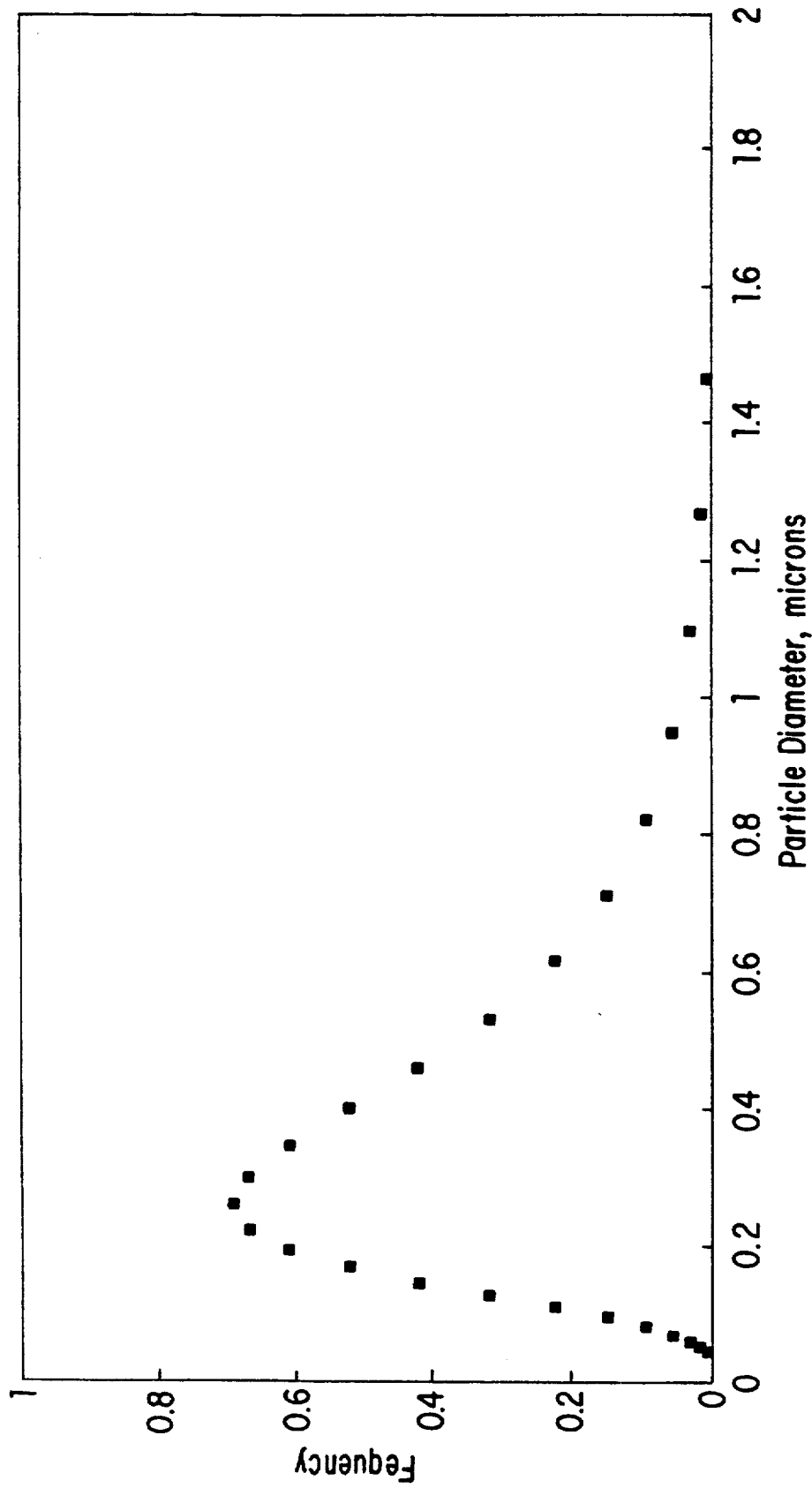
FIG. 8 illustrates the cumulative particle diameter distribution of a mineral spirits in a composition of the present invention.
Figure 9:
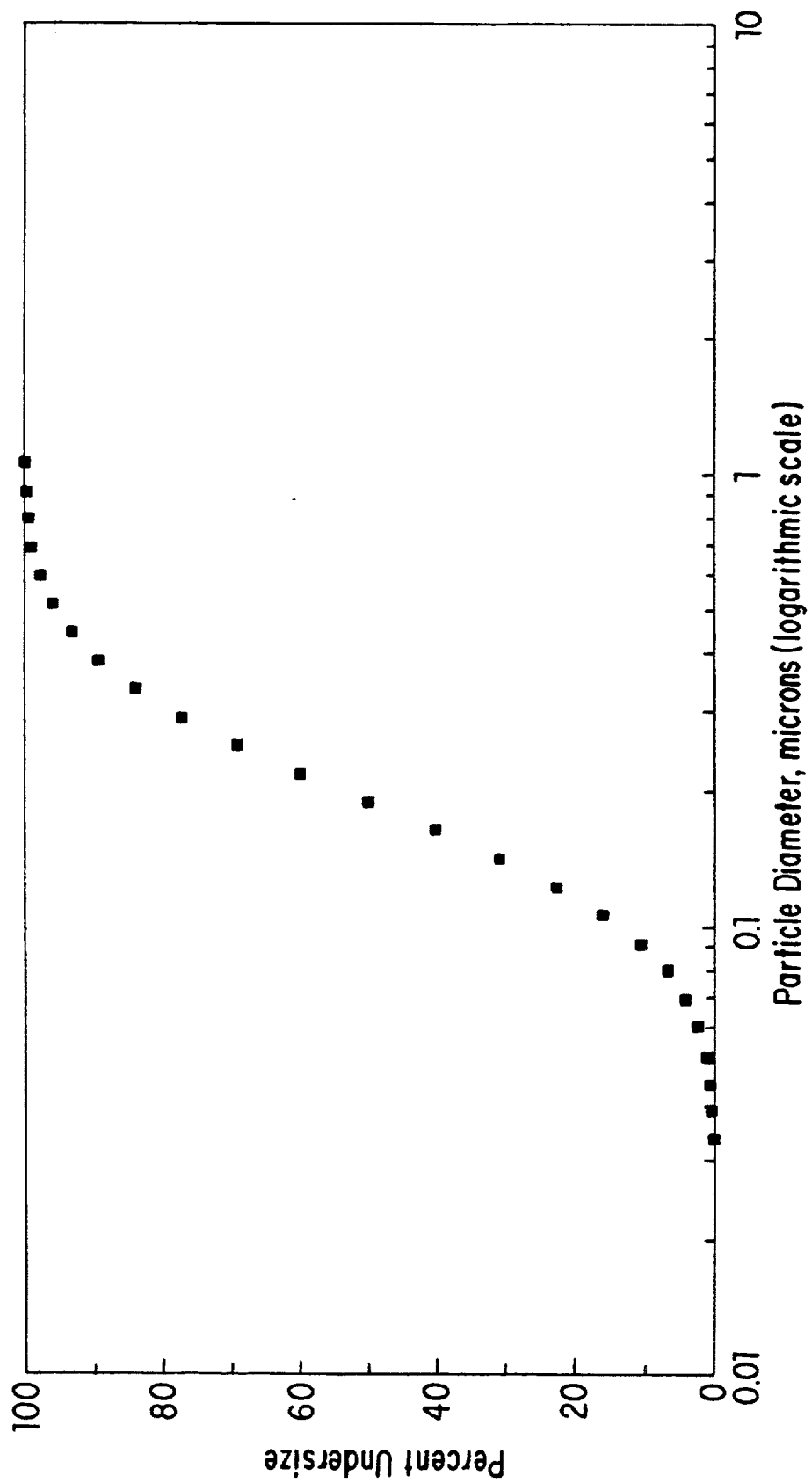
FIG. 9 illustrates the differential particle diameter distribution of a resin dissolved in xylene in a composition of the present invention.
Figure 10:
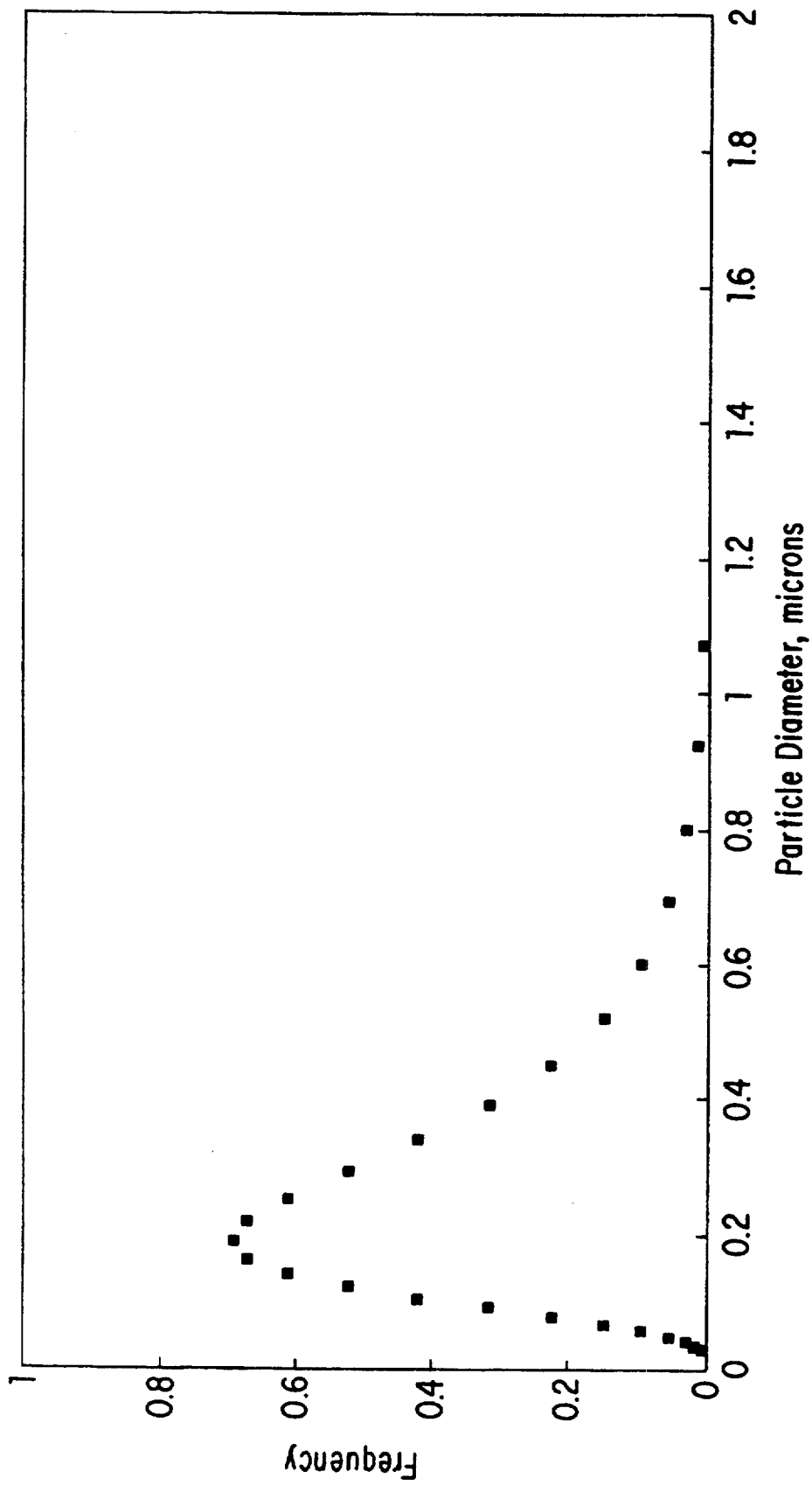
FIG. 10 illustrates the cumulative particle diameter distribution of a resin dissolved in xylene in a composition of the present invention.

A sample was left undisturbed for 10 days and had begun to separate. The sample was shaken vigorously and no disturbing foaming was experienced. The dispersion was then sampled beneath the surface and evaluated for particle size in acrylic cuvettes with a Brookhaven BI-90 photon correlation spectrometer. The diameter via light scattering was $0.50 \pm 0.06\mu$. The mineral oil was found to have a mass-weighted median diameter of $0.26\mu$ with a normalized standard deviation of $1.8_o$. The differential mass-weighted particle size distribution of this suspension is illustrated in FIG. 7. The cumulative mass-weighted particle size distribution of this suspension is illustrated in FIG. 8.

Example 5—Silicone Resin Delivery Composition

Isopropyl alcohol, xylene, a silicone resin, Q62230 from Dow Corning, and SILWET L-77 brand ethoxylated silicone surfactant were added to water so that weight percentages of these ingredients were respectively 6, 2, 3, 0.4, 88.6. This mixture was homogenized in the lab mixer. A wetting agent, FC-171, was added at 1000 ppm to the suspension. The suspension was sampled beneath the surface and evaluated for particle size in acrylic cuvettes with a Brookhaven BI-90 photon correlation spectrometer. The suspended solid, the resin, was found to have a diameter via light scattering of $0.36 \pm 0.04\mu$ with a normalized standard deviation of $1.8 \pm 0.1_o$. The mass-weighted median diameter of these particles was found to be $0.19\mu$ with a normalized standard deviation of $1.8_o$.

This composition delivered the resin to produce a coating on a surface.

When the liquid mixture described in Example 5 was heated on an aluminum sheet at 340° F. for one hour, a hard resin film was produced on the surface. Since the film was moderately slippery and adhered well to the aluminum surface, it is believed that many (100 or more) releases could be obtained when molding rubber parts when this film has been applied to the surface.

I claim:

1. A method for delivering an active ingredient having a viscosity of about 0.5 to about 10,000 csks at 25° C. in an aqueous dispersion comprising:
    a. providing a mixture of an active ingredient having a viscosity of less than 10,000 centistokes at 25° C., water and a volatile organic compound which is soluble in water and in which the active ingredient is dispersed, selected from the group consisting of low molecular weight amines and mixtures thereof;
    b. homogenizing the mixture to form a dispersion wherein at least 90% by weight of the active ingredient is suspended in particles of less than 1 micron in diameter; and
    c. applying said dispersion to a surface.
2. A method according to claim 1 wherein the mixture additionally comprises an alcohol selected from the group consisting of ethanol, 1-propanol, 1-methoxy 2-propanol, 1-butanol, 2-butanol and mixtures thereof.
3. A method according to claim 1 wherein the active ingredient is selected from the group consisting of silicone, lecithin, hydrocarbon oil, chlorinated solvent, and a mixture thereof.
4. A method according to claim 1 wherein the mixture is homogenized so that the active ingredient has a mass weighted mean particle diameter of between 0.10 and $0.40\mu$.
5. An aqueous composition for delivering mold release agents consisting essentially of:
    a. water in an amount of about 60% to about 96% by weight of the total composition;
    b. a volatile organic selected from the group consisting of low molecular weight alcohols and low molecular weight amines in an amount of about 4% to about 30% by weight of the total composition;

c. a mold release agent in an amount of about 0.1% to about 20% by weight of the total composition dispersed throughout the composition in particles wherein at least 90% of said particles have a diameter of less than 1.0μ; and d. a surfactant in an amount of about 0.003% to about 0.5% by weight of the total composition.

6. A composition according to claim 5 wherein the low molecular weight alcohol is selected from the group consisting of ethanol, 1-propanol, 1-methoxy 2-propanol, 1-butanol, 2-butanol and mixtures thereof.

7. A composition according to claim 5 wherein the low molecular weight amine is selected from the group consisting of 1-propyl amine, 2-propyl amine and mixtures thereof.

8. A composition according to claim 5 wherein the surfactant is selected from the group consisting of fluorocarbon, alcohol sulfate amine salt, alkyl phosphate ethoxylate, fluorinated alkyl alkoxylate and sulfonomide.

9. A composition according to claim 5 wherein the mold release agent is selected from the group consisting of silicone, lecithin, hydrocarbon oil, and chlorinated solvent.

10. A composition according to claim 5 wherein mole release agent has a mass weighted mean particle diameter of between about 0.10 and 0.40μ.

11. A composition according to claim 5 additionally comprising a second surfactant at 0.1–1.0% by weight of the composition selected from the group consisting of fluorinated alkyl alkoxylates and sulfonomides, fluorocarbons, alcohol sulfate amine salts, alcohol phosphate salts, alkyl phosphate ethoxylates and mixtures thereof.

12. A method of making an aqueous composition for delivering active ingredients having a viscosity of about 0.5 to about 10,000 csks at 25° C. comprising:

a. mixing water in an amount of about 60% to about 96% by weight of the total composition to a volatile organic selected from the group consisting of 1-propyl amine, 2-propyl amine and mixtures thereof in an amount of about 4% to about 30% by weight of the total composition and an active ingredient having a viscosity of about 0.5 to about 10,000 csks at 25° C. in an amount of about 0.5% to about 20% by weight of the total composition;

b. agitating said composition so that at least 90% by weight of the active ingredient is dispersed throughout the composition in particles with a mass-weighted mean particle diameter no greater than 1.0μ; and c. adding a surfactant to said mixture in an amount of about 0.003% to about 0.5% by weight of the total composition.

13. A method according to claim 12 additionally comprising mixing into the composition an alcohol selected from the group consisting of isopropyl alcohol, 1-propanol, 1-methoxy 2-propanol, ethanol, 1-butanol, 2-butanol and mixtures thereof.

14. A method according to claim 12 wherein the surfactant is selected from the group consisting of fluorocarbon, alcohol sulfate amine salt, alcohol phosphate salt, alkyl phosphate ethoxylate, sulfonomide and fluorinated alkyl alkoxylate.

15. A method according to claim 12 wherein the active ingredient is selected from the group consisting of silicone, hydrocarbon oil, vegetable oil, lecithin, and fatty acid.

16. A method according to claim 12 wherein the active ingredient is an insoluble soap.

17. A method according to claim 12 wherein active ingredient has a mass weighted mean particle diameter of between 0.10μ and 0.40μ.

18. A method of improving release of molded objects from molds comprising: spraying the mold with a mold release composition comprising:

i. water, present at about 60% to about 96% by weight of the composition;

ii. a release agent, present at about 0.5% to about 20% by weight of the composition;

iii. a surfactant, present at about 0.003% to about 0.5% by weight of the composition: and iv. a volatile organic compound, present at about 2% to about 20% by weight of the composition;

which has been homogenized such that so that essentially all of the agent has a particle diameter no greater than 1.0μ.

19. A method according to claim 18 wherein the volatile organic compound weight alcohol is selected from the group consisting of isopropyl alcohol, 1-propanol, 1-methoxy 2-propanol, ethanol, 1-butanol, 2-butanol and mixtures thereof.

20. A method according to claim 18 wherein the volatile organic compound is selected from the group consisting of 1-propyl amine, 2-propyl amine and mixtures thereof.

21. A method according to claim 18 wherein the surfactant is selected from the group consisting of fluorocarbons, alcohol sulfate amine salts, alkyl phosphate ethoxylates, fluorinated alkyl alkoxylates and sulfonomides.

22. A method according to claim 18 wherein the release agent is selected from the group consisting of silicone, lecithin, and hydrocarbon oils.

23. A method according to claim 18 wherein the mold release composition additionally comprises a water-insoluble compound selected from the group consisting of naphtha, water-insoluble aromatic hydrocarbon or a mixture thereof.

24. A method according to claim 18 wherein the release agent is a mixture of a high viscosity silicone and a low viscosity silicone.

25. The method according to claim 18 wherein said mold release composition additionally comprises 0.1 to 1.0% of a second surfactant for extending the shelf life of said composition selected from the group consisting of fluorinated alkyl alkoxylates and sulfonomides, fluorocarbons, alcohol sulfate amine salts, alcohol phosphate salts, alkyl phosphate ethoxylates and mixtures thereof.

26. The method according to claim 18 wherein the surfactant is present at about 0.2 weight percent of the composition.

* * * * *